United States Patent [19]

Mend et al.

[11] 3,909,520

[45] Sept. 30, 1975

[54] READOUT SYSTEM FOR A SOLID-STATE TELEVISION CAMERA

[75] Inventors: William G. Mend, Catonsville; Roland A. Anders, Baltimore, both of Md.

[73] Assignee: Westinghouse Electric Corporation, Pittsburgh, Pa.

[22] Filed: Feb. 29, 1972

[21] Appl. No.: 230,503

Related U.S. Application Data

[63] Continuation of Ser. No. 866,339, Oct. 14, 1969, abandoned.

[52] U.S. Cl. .............................. 178/7.1; 340/166 R

[51] Int. Cl.[2] .............................. H04N 3/14

[58] Field of Search .............. 178/7.1; 340/166 R; 307/311; 315/169 R, 169 TV; 250/211 R, 211 J; 317/235 N

[56] References Cited

UNITED STATES PATENTS

| | | | |
|---|---|---|---|
| 3,465,293 | 9/1969 | Weckler | 340/166 R |
| 3,470,318 | 9/1969 | Webb | 178/7.1 |
| 3,562,418 | 2/1971 | Glusick et al. | 178/7.1 |

*Primary Examiner*—Robert L. Griffin
*Assistant Examiner*—George G. Stellar
*Attorney, Agent, or Firm*—D. Schron

[57] ABSTRACT

Described is a readout system for a solid-state television camera of the type comprising a mosaic of semiconductive photosensors which are turned ON or enabled in sequence starting from one end of a horizontal line and progressing to the other end, whereupon the photosensors in the next horizontal line are turned ON in sequence and so on until the whole mosaic, having an image focused thereon, is scanned in much the same way as the photosensitive surface of an electron-optics camera tube. Readout is accomplished by sequentially connecting the emitters of each horizontal line to ground using transistor switches; while the mosaic's collector rows are connected through a load resistor, across which the video signal appears, to a source of positive potential. The collector rows are switched at a rate corresponding to the vertical scanning frequency of a conventional camera tube, which is much lower than the horizontal scanning frequency. Consequently, the noise introduced into the system and appearing across the load resistor due to switching transients is materially reduced.

5 Claims, 3 Drawing Figures

INVENTORS.
WILLIAM G. MEND
ROLAND A. ANDERS
By Ernest P. Klipfel
Attorney

READOUT SYSTEM FOR A SOLID-STATE TELEVISION CAMERA

CROSS-REFERENCES TO RELATED APPLICATIONS

This is a continuation of application Ser. No. 866,339 filed Oct. 14, 1969, now abandoned.

BACKGROUND OF THE INVENTION

As is known, the usual device for converting an optical image into an electrical video signal comprises an electron-optics device, such as an orthicon or vidicon, wherein light is focused onto a photosensitive surface. By scanning the photosensitive surface with an electron beam, an electrical video signal is produced which can be transmitted to a receiving tube where the image is reproduced in another electron-optics device.

Normally, the electron beam of such a device scans back and forth across the photosensitive surface at a high frequency, and is deflected in the vertical direction at a much lower frequency such that the electron beam will scan one horizontal line, then will "flyback" and move downwardly to the next line where it again scans horizontally, and so on, until a complete frame is scanned.

Such electron-optics devices utilizing an electron beam are relatively fragile and necessitate the use of an evacuated glass envelope. As a result, they are sensitive to vibration and cannot be used in certain environmental conditions. Furthermore, conventional camera tubes of this type are not readily adaptable to miniaturization or reductions in power consumption.

Recently, solid-state television camera systems have been developed which are much more rugged than the conventional type. They can be readily miniaturized by integrated circuit techniques, and require much less power than the conventional type of camera tube. Such devices comprise a monolithic semiconductive wafer having a plurality of phototransistors formed therein. The phototransistors can be arranged in horizontally spaced columns along the X direction with the emitters in each column interconnected, and in vertically spaced rows along the Y direction with the collectors in each row interconnected. Scanning an image focused onto the mosaic in the horizontal direction is achieved by sequentially connecting the emitters in the respective rows to ground; while scanning in the vertical direction (at a much lower frequency) is achieved by sequentially connecting the collectors in the respective rows to a source of driving potential.

In the past, it has been common to derive a video signal from a solid-state camera of this type by means of a load resistor connected to the emitters of the phototransistors, this load resistor being connected to the emitters through field effect transistor switches. A difficulty encountered in such an emitter readout system, however, is noise contributions from the field effect switching pulses. The gate switching signal is a fast rise, voltage pulse which couples capacitively through the field effect transistor capacitance to the emitter load. The only path for the switching transients is through the load or the mosaic. While in the common load there is a switch turning ON at the same time another is turning OFF, thus providing some cancellation of the noise spike, the transients do affect the output, resulting in noise which occurs across the entire frame at the extremely high switching frequencies required.

SUMMARY OF THE INVENTION

As an overall object, the present invention seeks to provide a solid-state television camera which overcomes the disadvantages of prior art devices of this type due to noise from high frequency switching pulses.

More specifically, an object of the invention is to provide a television camera of the type described comprising a mosaic sensor having a plurality of rows of phototransistors with emitters interconnected in each column and collectors interconnected in each row at right angles to the emitter columns, together with means for deriving a video output signal from a load resistor connected to the collectors of the phototransistors.

In accordance with the invention, a solid-state electro-optical device is provided comprising a plurality of phototransistors onto which an optical image is focused, the transistors being arranged in columns with transistors in the respective columns being arranged in rows essentially at right angles to the columns. Means including an emitter switch for each of the columns is provided for simultaneously connecting the emitters of the phototransistors in a column to a point of reference potential. Further means is provided including a collector switch for each of the rows for simultaneously connecting the collectors of the transistors in a row to one end of a load resistor across which a video output signal appears, the other end of the load resistor being connected to a source of driving potential for the transistors. Finally, means are provided for sequentially closing the collector switches at a closing rate lower than the rate at which the emitter switches are closed.

In the operation of the device, all of the emitter switches will be closed before a collector switch is closed; and after all of the emitter switches are again closed in sequence, the next successive collector switch will be closed. In this manner, successive activated phototransistors will scan across an image focused upon a plurality of transistors arranged in a mosaic along what can be compared to a horizontal line of a conventional television camera tube, and then moved downwardly to the next line upon closing of the next collector switch where the process is repeated until a complete frame has been scanned. By virtue of the fact that the load resistor is connected to the collector switches rather than the emitter switches, the frequency of switching transients which pass through the load resistor and appear in the video output signal is materially reduced, the switching noise occurring only at the beginning and end of each scanning line and not across the entire mosaic output as is the case when a load resistor is connected to the emitters of the phototransistors.

The above and other objects and features of the invention will become apparent from the following detailed description taken in connection with the accompanying drawings which form a part of this specification, and in which.

Figure 1:
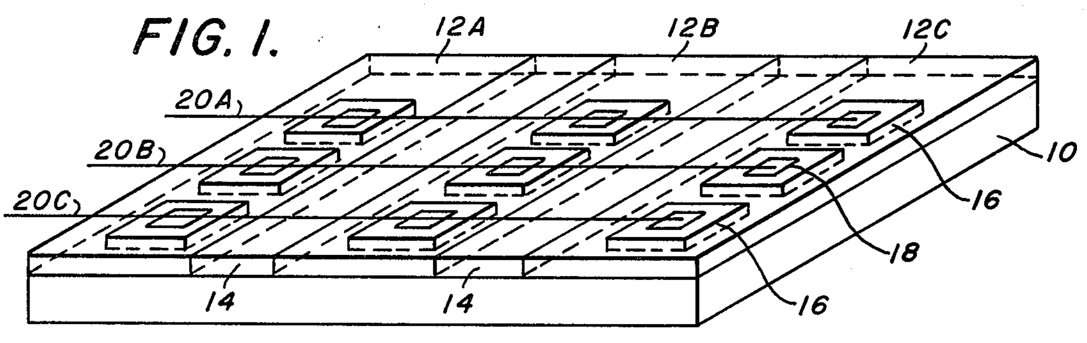
FIG. 1 is a perspective view of a mosaic of photosensitive transistors of the type utilized in accordance with the present invention.

With reference now to the drawings, and particularly to FIG. 1, a section of a mosaic which can be used in accordance with the invention is shown. It comprises a wafer 10 of semiconductive material, such as silicon, having parallel N-type regions 12A, 12B and 12C diffused therein to form interconnected collector rows. Adjacent collector rows are completely insulated by diffused P-type isolation areas 14. Spaced along each of the collector rows 12A, 12B, and 12C are discrete base regions 16 which, in turn, have emitter regions 18 diffused therein, the base regions 16 being P-type and the emitter regions being N-type.

As will be understood, the configuration shown in FIG. 1 can be extended in both the X and Y direction up to any desired number, N. The emitters 18 can be connected together in columns by vapor deposited metalized leads 20A, 20B and 20C, and so on. Similarly, metalized leads, not shown, can be connected to the collector columns 12A, 12B, 12C, and so on. By focusing an image onto the surface of the assembly shown in FIG. 1, and by sequentially turning ON the individual photoconductive transistors, the entire image can be scanned in much the same manner as an electron beam of a conventional vidicon scans an image on a photosensitive surface. For example, the collector 12A can be connected to a source of positive potential. Thereafter, by sequentially grounding leads 20A, 20B and 20C, etc., the individual transistors are momentarily turned ON in sequence, whereby the current flowing through each transistor and appearing across a common load will be proportional, at any instant, to the light intensity of the image at a point covered by an individual phototransistor. After one complete line has been scanned, the collector row 12A is disconnected from the source of driving potential and the collector row 12B is connected to the source of potential, whereupon the leads 20A, 20B, 20C, etc. are again sequentially grounded whereby the next line is scanned.

Figure 2:
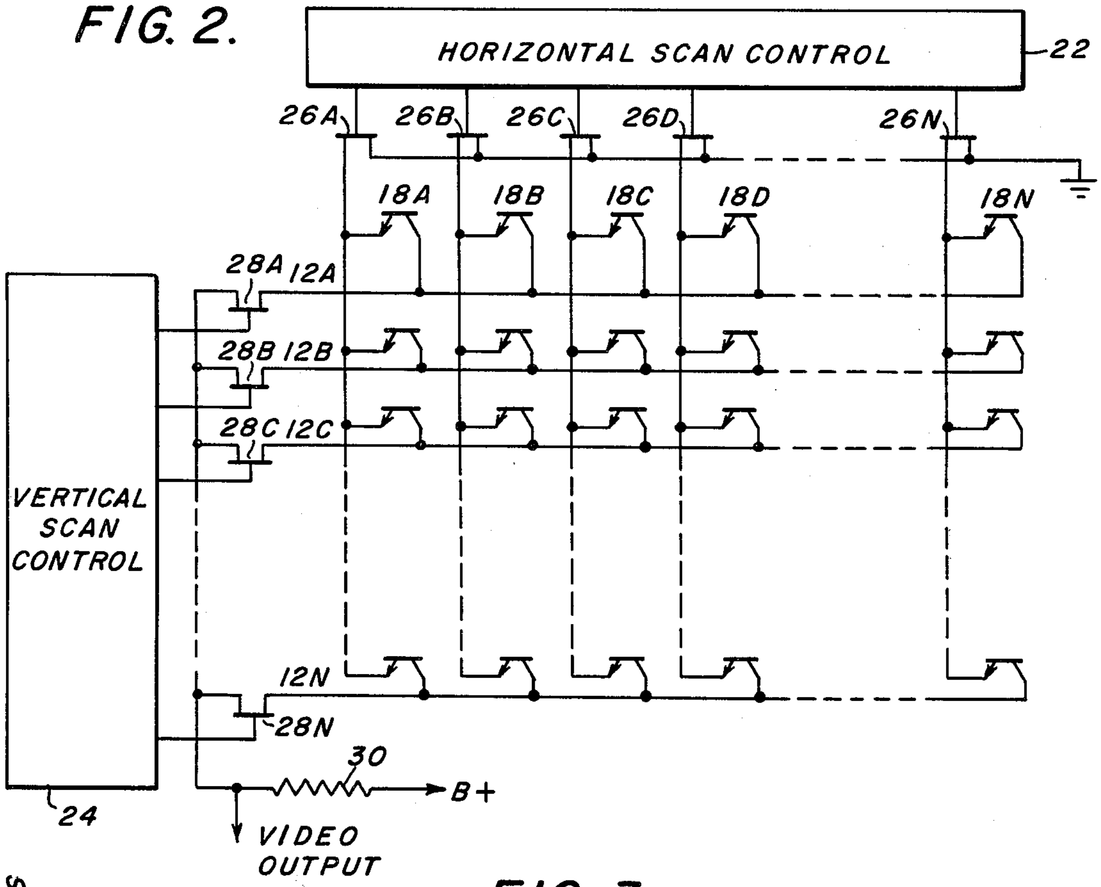
FIG. 2 is a schematic circuit diagram illustrating the operation of the invention.

Circuitry for accomplishing the scanning function is shown in FIG. 2 and includes a horizontal scan control circuit 22 and a verticl scan control circuit 24. The horizontal scan control circuit is connected to the gate electrodes of a plurality of field effect transistor switches 26A–26N. An advantage of this technique is that field effect transistors need not be used in the emitter communication circuitry since the base current flows to ground and does not enter the signal path. Simple bipolar transistors can thus be used for this high speed switching — a technique not suitable for the former emitter readout system. The source electrode of transistor 26A is connected to all of the emitters in the emitter column 18A; the source electrode of transistor 26B is connected to the emitters of all of the transistors in emitter column 18B; and so on. The drain electrodes of these same field effect transistors are grounded, the arrangement being such that whenever the transistor 26A, for example, is turned ON, the emitters of all the phototransistors in the emitter column 18A will be grounded. Similarly, when transistor 26B is turned ON, the emitters of all of the phototransistors in collector column 18B will be grounded.

The vertical scan control circuit 24 is connected to the gate electrodes of field effect transistors 28A–28N. The source electrode of field effect transistor 28A is connected to the collectors of all of the phototransistors in collector row 12A; the source electrode of field effect transistor 28B is connected to the collectors of all the phototransistors in collector row 12B, and so on.

In the operation, the horizontal scanning frequency is caused to be much higher than the vertical scanning frequency. When field effect transistor 28A is turned ON, the field effect transistors 26A, 26B, 26C, 26D, and so on, are turned ON in sequence. However, since only the collectors of collector row 12A are turned ON, only those transistors in collector row 12A will be activated. The transistor 28A, for example, connects the common collector of the sequentially activated transistors in row 12A through a load resistor 30 to a source of positive B+ potential. The video signal, therefore, will appear across the resistor 30. After all of the transistors in collector row 12A are turned ON in sequence, transistor 28B is turned ON, whereupon the transistors 26A–26N are again turned ON in sequence to cause scanning of the next row or horizontal line of a frame.

As will be appreciated, transients will occur each time any one of the field effect switches is turned ON. However, since the emitters are connected to ground, a low impedance path is presented for the high frequency commutation spikes which do not pass through the load resistor 30, or at least appear across the load resistor in amplitude. When the transistors 28A–28N are turned ON, commutation spikes do occur; however these occur at a much lower frequency than the commutation spikes at the emitters, and they occur only at the beginning and end of each collector readout time rather than at each sample (i.e., at the beginning and end of each line of a frame). Thus, the switching noise does not place pattern noise across the entire mosaic readout but rather only at the beginning and end of each line. That is, the beginning and end of scanning of each collector row.

Figure 3:
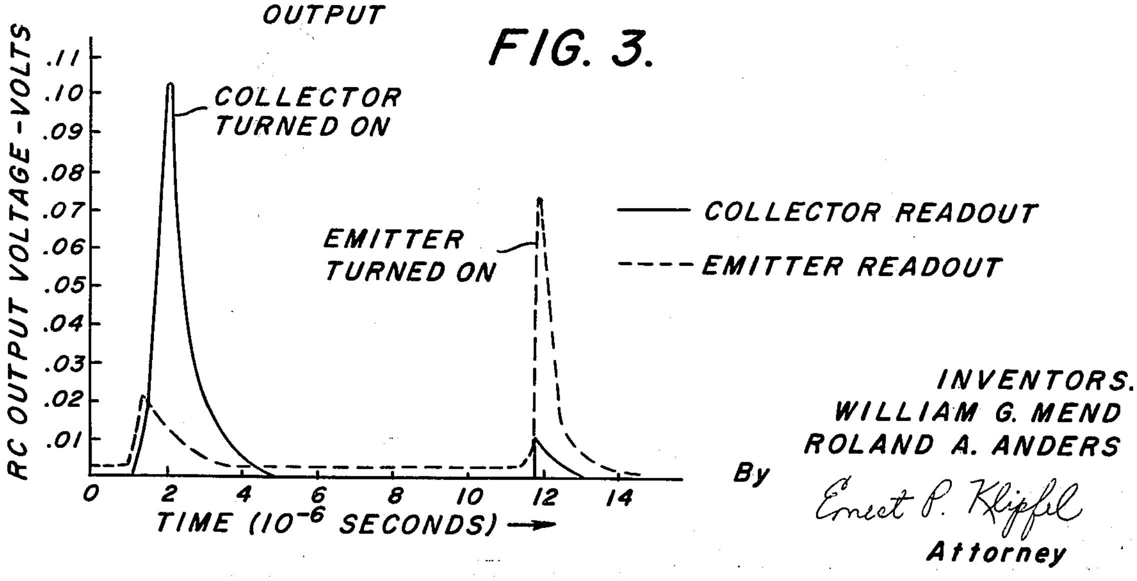
FIG. 3 is a graph showing the comparison of switching transients for the case where the load resistor is connected to the emitters and the case where the load resistor is connected to the collectors of the phototransistors.

A comparison of the voltage spikes occurring under conditions of emitter readout and collector readout is shown in FIG. 3. Note that while the spikes do occur across the load resistor 30 even under collector readout conditions, they are much lower in amplitude than is the case when the load resistor is connected to the emitters. The spike which occurs when the collectors are turned ON is much higher than it would be if the load resistor were connected to the emitters. However, as mentioned above, this occurs only at the beginning and end of each scanning line.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In a solid state electro-optical device, the combination of a mosaic sensor including a plurality of phototransistors onto which an optical image is to be focused, said transistors being arranged in a plurality of rows and orthogonal columns thus forming a matrix, the collectors of the phototransistors in the respective rows being connected to a first set of common conductors, the emitters of the phototransistors in the respective columns being connected to a second set of common conductors, a first set of collector switches equal in number to the number of rows connected between said first set of conductors and a first terminal, a second set of emitter switches equal in number to the number of columns connected between said second set of conductors and a second terminal, a load resistor connected between said first terminal and a third terminal, a source of direct current driving potential directly connected to said second and third terminals, means for sequentially closing said first set of switches, and means for sequentially closing said second set of switches at a rate higher than the closing rate of said first set to provide readout of said phototransistors in succession while commutating the emitters thereof to said second terminal.

2. The combination of claim 1 wherein said emitter switches and collector switches comprise field effect transistors.

3. The solid-state electro-optical device of claim 1 wherein said phototransistors are formed on a single wafer of semiconductive material.

4. The solid-state electro-optical device of claim 3 wherein said emitters of the phototransistors are interconnected by means of strips of electrical conductive material vapor deposited onto said wafer of semiconductive material.

5. The solid-state electro-optical device of claim 1 wherein a collector switch is closed, followed by sequential closing of all emitter switches before the next successive collector switch is closed.

* * * * *